(12) United States Patent
Wheelwright

(10) Patent No.: US 10,359,096 B2
(45) Date of Patent: Jul. 23, 2019

(54) CORD LOCKING DEVICE

(71) Applicant: Troy Wheelwright, Amesbury, MA (US)

(72) Inventor: Troy Wheelwright, Amesbury, MA (US)

(73) Assignee: Troy Wheelwright, Amesbury, MA (US)

( * ) Notice: Subject to any disclaimer, the term of this patent is extended or adjusted under 35 U.S.C. 154(b) by 342 days.

(21) Appl. No.: 15/312,460

(22) PCT Filed: May 20, 2015

(86) PCT No.: PCT/US2015/031734
§ 371 (c)(1),
(2) Date: Nov. 18, 2016

(87) PCT Pub. No.: WO2015/179495
PCT Pub. Date: Nov. 26, 2015

(65) Prior Publication Data
US 2017/0108080 A1      Apr. 20, 2017

Related U.S. Application Data

(60) Provisional application No. 62/000,762, filed on May 20, 2014.

(51) Int. Cl.
*F16G 11/04*      (2006.01)
*F16G 11/14*      (2006.01)

(52) U.S. Cl.
CPC ......... *F16G 11/048* (2013.01); *F16G 11/044* (2013.01); *F16G 11/046* (2013.01); *F16G 11/14* (2013.01); *F16G 11/146* (2013.01)

(58) Field of Classification Search
CPC ...... F16G 11/044; F16G 11/046; F16G 11/14; F16G 11/146; F16G 11/048
See application file for complete search history.

(56) References Cited

U.S. PATENT DOCUMENTS 1,427,114 A * 8/1922 Martin .................. F16G 11/048
403/210
2,217,400 A   10/1940 Gallagher
(Continued)

FOREIGN PATENT DOCUMENTS

GB       2066891       7/1981

OTHER PUBLICATIONS

International Preliminary Report on Patentability in Application PCT/US2015/031734, dated Nov. 22, 2016.US-PTO.
(Continued)

*Primary Examiner* — Robert Sandy

(57) ABSTRACT

A cord locking device (100) applies compressive forces and restrictive configurations to at least one end of a cord (138) for inhibiting movement of a cord (138) placed around or through first and second objects (146, 172). The cord locking device (100) receives at least a first cord end (142) that passes through a cord lock device (106) and an aperture (126) in a threadably engageable cap (124). The cap (124) applies a frictional force on the cord against the cord lock device to prevent movement of the cord through the cord lock device. A second end of the cord (164) may be inserted into the body portion of the cord lock device (106) to be secured frictionally or alternatively, a second end of a cord may be attached to a connector device (140) which in turn is mechanically attached to a top region of the cord lock device (106).

9 Claims, 12 Drawing Sheets

(56) References Cited

U.S. PATENT DOCUMENTS

| | | | | |
|---|---|---|---|---|
| 2,225,169 | A | | 12/1940 | Gallagher |
| 2,337,895 | A | | 12/1943 | Jaszczak |
| 2,595,057 | A | * | 4/1952 | Cotter ............... F16G 11/048 174/84 S |
| 2,913,790 | A | * | 11/1959 | Meisen ............. F16G 11/025 403/210 |
| 6,077,129 | A | | 6/2000 | Silfvergerg |
| 6,115,890 | A | * | 9/2000 | Silagy ................ E06B 9/326 24/115 M |
| 7,707,697 | B2 | * | 5/2010 | Brennan ............ F16G 11/06 24/115 R |

OTHER PUBLICATIONS

International Search Report for PCT Application PCT./US2015/031734, US PTO, dated Sep. 8, 2015.
Written Opinion of International Search Report PCT/US2015/031734, US PTO, dated Sep. 8, 2015.

* cited by examiner

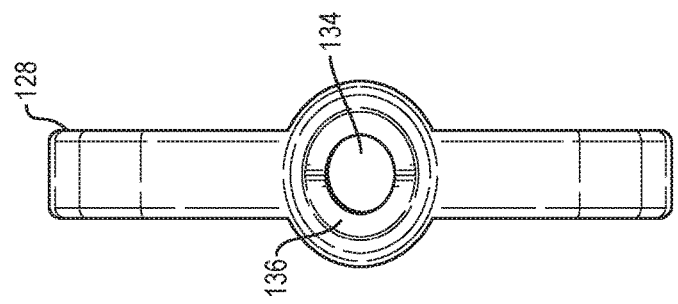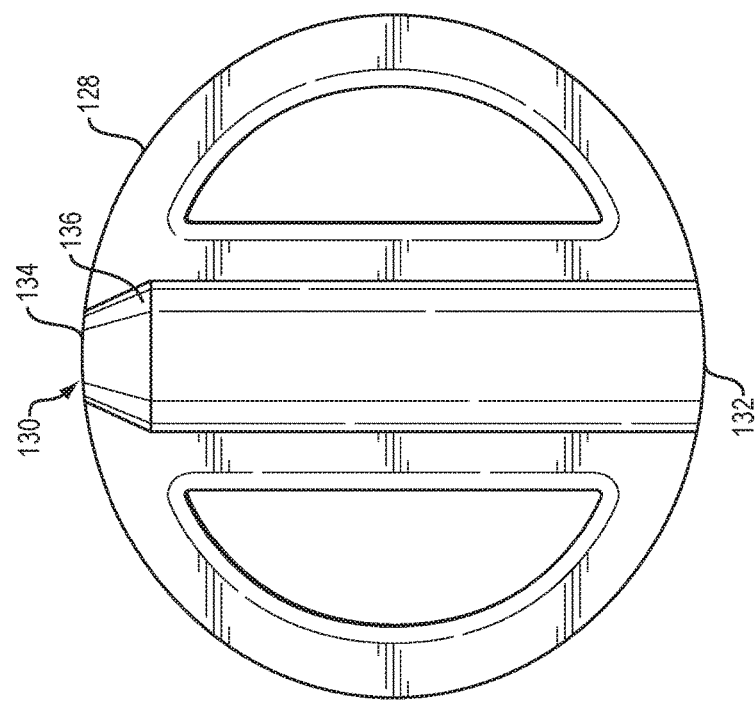

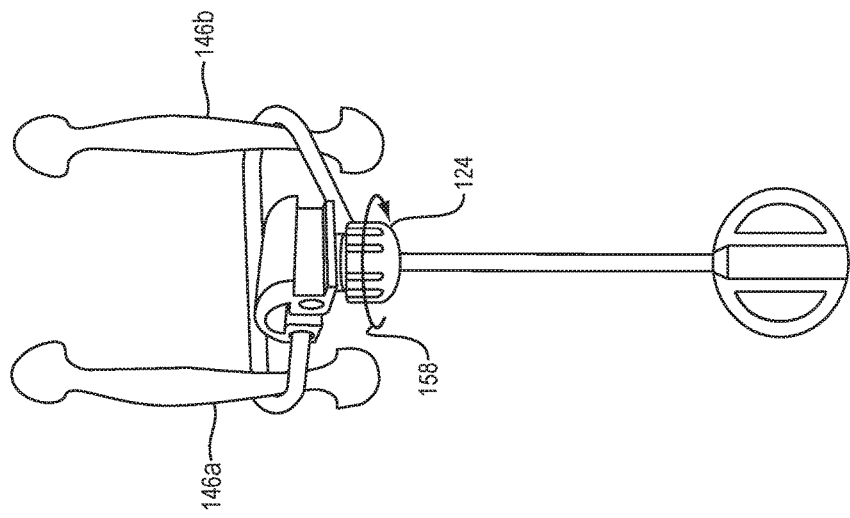
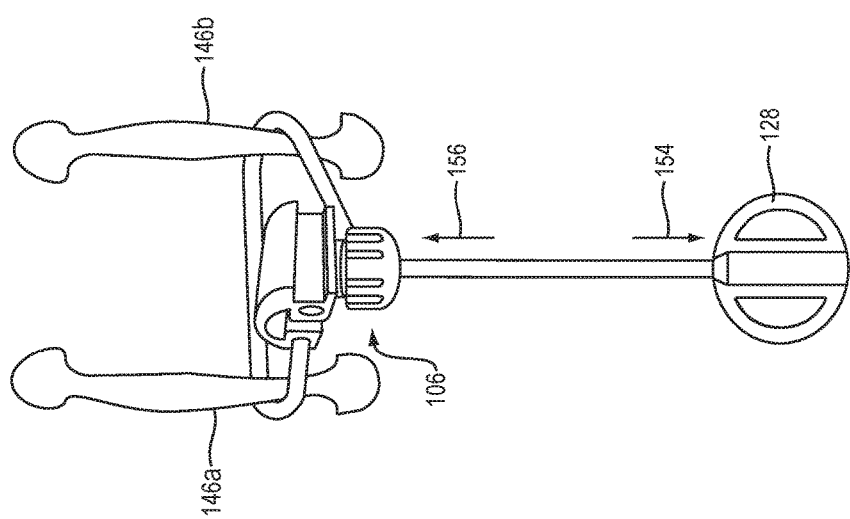

CORD LOCKING DEVICE

FIELD OF THE INVENTION

The present invention relates generally to a cord locking device and more particularly, to a cord locking device that applies compressive forces and restrictive configurations on one or two ends of a cord for inhibiting movement by a first and second object to or around which the cord is provided.

BACKGROUND OF THE INVENTION

Cabinets as well as other storage devices which have doors and are at a level accessible to children must often be "child proofed" to prevent children from accessing the contents of the cabinet or storage device to prevent access to other dangerous materials or materials that the homeowner does not wish children to access.

Prior art devices designed to "child proof" cabinets have typically been hard plastic devices. These devices are sometimes difficult to use (sometimes requiring two hands to set and/or unset); are large enough such that they do not fit behind or around many door knobs, and almost certainly do not allow for their use around corners such is required for a corner cupboard.

Accordingly, what is needed is a childproof cupboard closure that is easy to use, for example operable with one hand, and can sit behind almost any knob and will work around a corner cupboard.

SUMMARY OF THE INVENTION

The invention features a cord locking device, for locking a cord around one or more objects by restricting longitudinal movement of a cord utilizing compressive forces and restrictive configurations. The cord locking device comprises a cord having a length, a first end and a second end and an intermediate portion disposed between the first and second ends. A cord lock device comprises a top region and a bottom region and a body portion.

The body portion of the cord lock device includes a first cord channel extending from the top region to the bottom region at least partially through the body portion. The first cord channel is configured for receiving a first cord portion from the top region of the cord lock device and is disposed proximate a side region of the body portion.

The body portion also includes a second cord channel extending from the top region to the bottom region at least partially through the body portion. The second cord channel is configured for receiving a second cord end from the top region of the cord lock device. The second cord channel is disposed proximate a side region of the body portion.

A first cord end channel extending from the bottom region at least partially through the body portion of the cord lock device is also provided. The first cord end channel is configured for receiving a first cord end from the bottom region. A second cord end channel extends from the bottom region at least partially through the body portion of the cord lock device. The second cord end channel is configured for receiving a second cord end from the bottom region.

Also provided is a circular cap, configured to adjustably engage and disengage with the bottom region of the body portion of the cord lock device. The circular cap includes an aperture sized and configured to receive one of the first and second cord ends from one of the first and second cord channels. The cap is configured to incrementally move towards and away from the bottom region of the body portion of the cord lock device.

The cap aperture is arranged generally in a central position in the circular cap, misaligned axially with the first and second cord channels, and configured to enable passage of one of the first and second cord ends through the cap aperture. The misalignment between an exit opening of one of the first and second cord channels and the cap aperture is configured to cause a portion of the cord disposed between the bottom region of the cord lock device and the cap aperture to follow a restrictive path between the exit opening of one of the first and second cord channels and the cap aperture, with a portion of the cord disposed against the bottom region of the cord lock device.

An interior surface of the cap is configured, when in an engaged position against the body portion of the cord lock device, to generate a frictional force against the portion of the cord disposed between the inside surface of the cap and a generally flat planer area of the bottom portion of the body portion of the cord lock device, for restrictively compressing the cord portion between the generally flat planer area proximate the cord channel exit opening and the inside surface of the cap.

In one embodiment, the first cord channel is oriented in the body portion 180 degrees from the second cord channel while the first cord end channel is oriented in the body portion 180° from the second cord end channel. Moreover, the first and second cord end channels are oriented in the body portion 90 degrees from the first and second cord channels. The first and second cord end channels preferably have a diameter which is less than a diameter of the first and second cord channels.

The cord locking device may further include a handle portion configured to receive one of the first and second cord ends after exiting from the cap aperture. The handle portion comprises a handle top end oriented towards the cord locking device and a handle bottom end oriented away from the device. The cord locking device handle portion includes a handle aperture configured to enable passage of one of the first and second cord ends through the handle portion in a first direction. The handle portion further includes a shoulder region proximate an exit region of the handle aperture. The shoulder region is configured to restrict passage of the one of the first and second cord ends in a second direction opposite the first direction after passage through the handle aperture.

In another embodiment the cord locking device may further include a cord connector, fixedly coupled to one of the first and second cord ends, and configured to mechanically interconnect with a top region of the cord lock device.

The invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention.

BRIEF DESCRIPTION OF THE DRAWINGS

These and other features and advantages of the present invention will be better understood by reading the following detailed description, taken together with the drawings wherein:

FIGS. 5A and 5B are perspective views of an exemplary cord end in accordance with the present invention, where FIG. 5A is a side view and FIG. 5B is a top view;

FIG. 11 is a perspective view of the cord locking device in accordance with the teachings of FIG. 7 illustrating the adjustment procedure to be performed when utilizing the cord locking device of the invention;

FIG. 12 is a perspective view of the cord locking device in accordance with the teachings of FIG. 7 illustrating the securing of the cap to the lock and thus securing the cord by the cord locking device in accordance with the present invention;

DETAILED DESCRIPTION OF THE INVENTION

The following detailed description is merely exemplary in nature and is not intended to limit the described embodiments or the application and uses of the present invention has described in the exemplary embodiments. As used herein, the word "exemplary" or "illustrative" means "serving as an example, instance, or illustration." Any implementation described herein is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims and their legal equivalents.

Figure 1:
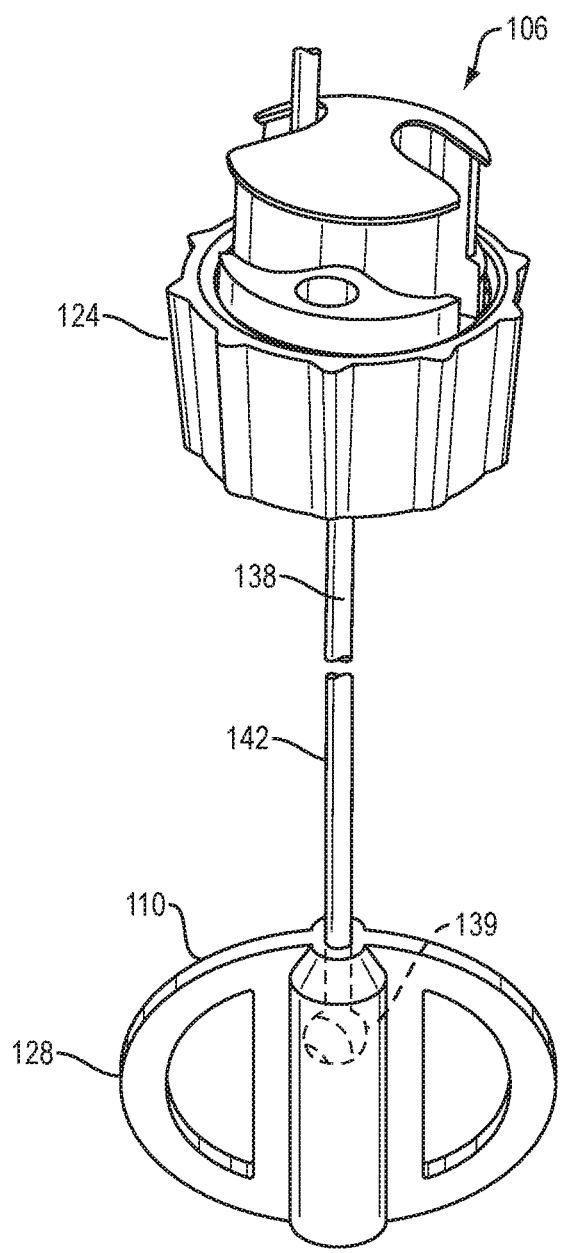
FIG. 1 is a perspective view of an exemplary cord locking device including lock and, in accordance with the present invention.

For purposes of description herein, the terms "upper," "lower," "left," "right," "rear," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes/uses illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A cord locking device 100, FIG. 1, in accordance with the teachings of the present invention, includes a lock portion 106 and a cap portion 124. The cord locking device 100 is configured to lock or secure a cord 138 in a restrictive configuration over and/or around first and second objects such as cupboard handles, knobs or the like. The restrictive configuration of the cord 138 as it travels through the lock 106 portion and held in place by the cap 124 portion inhibits movement of the cord 138 which in turn inhibits movement by or of the objects (i.e. prevents two adjacent cupboard doors from being opened by a child for example), and also works to restricts accidental manipulation of the objects or the cord.

In one embodiment, the first object includes a first door, and the second object includes a second door. The doors pivotally move between an open and a closed position. The cord locking device 100 retains the cord 138 in a tight closure over/through the objects to prevent movement by the objects, such as between a closed position and an open position.

Those skilled in the art will recognize that the cord locking device 100 can be installed on any type of device or container with doors to restrict movement of the doors, or prevent accidental opening of the doors. The doors may be configured to move between the open and closed position through a hinge, a sliding rail, or through complete detachment from the container. The container may include, without limitation, a cupboard, a cabinet, a closet, a pantry, a freezer, a cargo container, and in some instances a trigger on a firearm. The locking device 100 is efficacious for restricting access to the container where security of the contents from children, the elderly, pets or similarly unauthorized or undesired users is desired. Other undesirable manipulations of the doors from earthquakes, accidents, or the like may also be restricted by the cord locking device 100.

In the preferred embodiment, the cord locking device 100 is configured to receive and secure a cord or string (indicated generally by reference 138), such as a shoestring type string, having an intermediary portion and 2 end portions which are typically of a smaller diameter and coated with a hard or rigid coating which prevents the cord end from fraying, much like an aglet on a shoelace.

Figure 2:
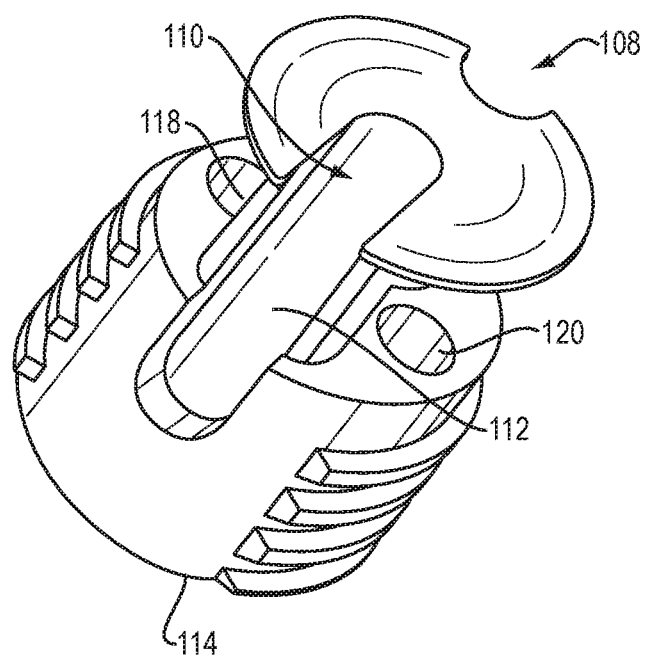
FIG. 2 is a top side view of the cord locking device of FIG. 1 with the cap removed.
Figure 3:
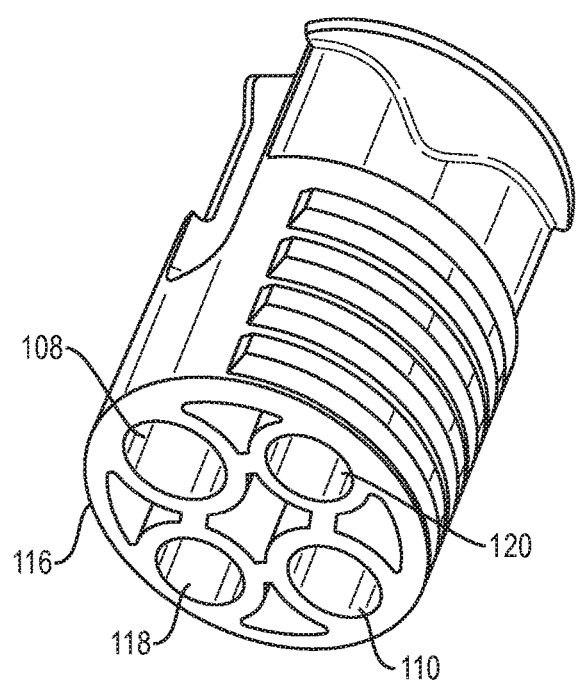
FIG. 3 is a bottom side view of the cord locking device of FIG. 1.

The lock portion 106, shown in greater detail in FIGS. 2 and 3, includes first and second cord channels 108 and 110 (both of which are essentially identical) and each of which include an open region 112 and a closed region 114. Each of the first and second cord channels 108, 110 include an opening in the bottom region 116 of the lock portion 106. The lock portion 106 also includes first and second cord end channels 118, 120 which extend from the bottom region 116 upward to approximately ⅔ to ¾ of the length of the lock portion 106. The first and second cord end channels 118, 120 preferably have a slightly smaller diameter than the first and second cord channels 108, 110 and are designed and configured to receive the coated cord end which has a slightly smaller than diameter than that of the middle section 138 of the cord.

Figure 4:
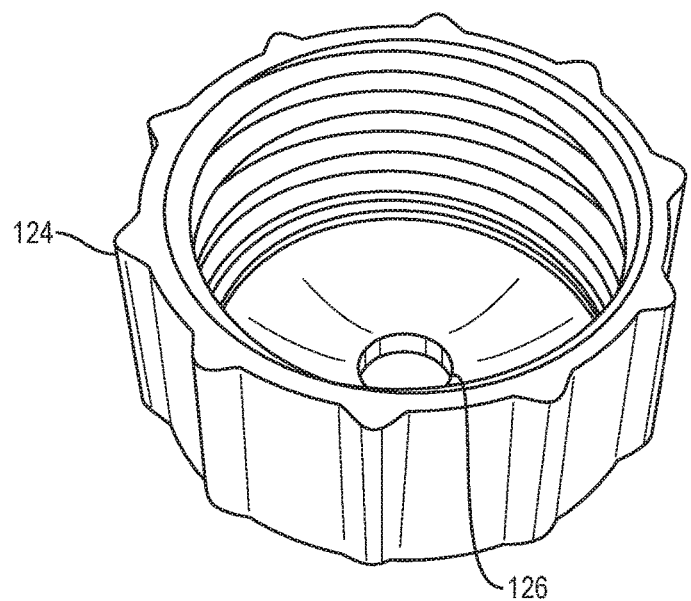
FIG. 4 is a perspective view of an exemplary cap used with the cord locking device of the present invention.

As shown in greater detail in FIG. 4, the cap 124 includes a concentric cap aperture 126. The concentric cap aperture 126 is sized and dimensioned to enable easy passage of the second cord end 142. When engaged with the bottom end 116 which is generally flat, the concentric cap aperture 126 is substantially misaligned with either the first or second cord channels 108, 110 meaning that the opening of the first or second cord channels 108, 110 does not align with the cap aperture 126.

In the preferred embodiment, first and second cord channels 108, 110 are located generally proximate a side region of the bottom 116 of the lock 106 while the aperture 126 is generally centrally located in the cap 124. It is this intentional so called "misalignment" that causes the cord end or region identified as 138 to follow a non-direct or L-shaped path upon exiting the cord channel opening in the bottom 116 of the lock 106, creating frictional contact between the generally flat bottom surface of the bottom end 116 of the lock portion 106 and an inner surface 119 of the annular cap 124 as shown generally in FIG. 6 when the cap 124 is tightened snug against the bottom end 116 of the lock 106; thereby essentially "locking" the cord region 138 in the cord channel 108 and preventing linear, up-and-down movement of the cord through the cord lock 106.

As shown in FIG. 5A, the second cord end 142 extends down from the annular cap 124. The second cord end 142 may then be manipulated as desired. In one embodiment, a handle portion 128 may be provided which forms a secure attachment with the second cord end 142 for facilitating the manipulation and forming a cover for the second cord end 142. The handle portion 128 in this embodiment comprises a plastic element having a handle top end 130 oriented towards the cord locking device 100, and a handle bottom end 132 oriented away from the cord locking device 100. The handle portion 128 further comprises a handle aperture 134 and a shoulder area 136 that surrounds the handle aperture 134.

The second cord end 142 is first passed through the handle aperture 134 in the handle top end 130, passing through and exiting through the handle bottom end 132. Once passed through, a knot or other restrictive barrier (see for example knot 139 FIG. 1) is applied to the second cord end 142. The knot is sized to be smaller than the diameter of the handle aperture 134, yet larger than the diameter of the shoulder area 136. In this manner, applying a downward force on the handle portion 128 secures the second cord end 142 inside the handle portion 128, as the knot abuts against the shoulder area 136. The size of the handle portion 128, if provided, is large enough to prevent the handle portion 128 from being ingested by a child. A representative size for an exemplary handle portion 128 is approximately 2" in diameter.

Figure 7:
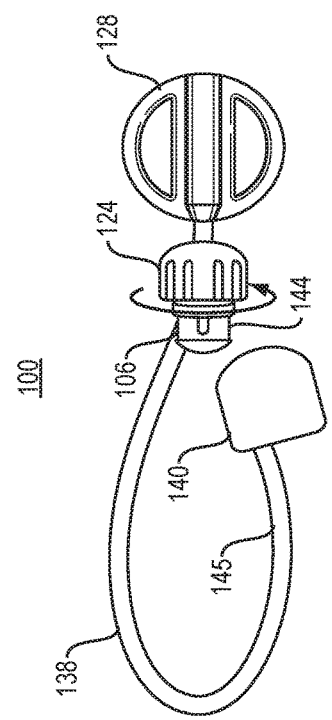
FIG. 7 is a perspective view of the cord locking device in accordance with the present invention ready to be utilized in accordance with one embodiment of the use of the present invention.

In a first embodiment, a cord locking device 100, FIG. 7, includes a cord lock 106 and 124 as well as handle 128 coupled to a cord 138 as previously described. In this embodiment, a connector 140, to which is fixedly coupled cord end 145, is designed and configured to interconnect with a Lop region 144 of the cord lock 106, as will be explained in greater detail below. This embodiment of the cord locking device 100 is well-suited to secure two adjacent cabinet doors each of which include a handle 146.

Figure 8:
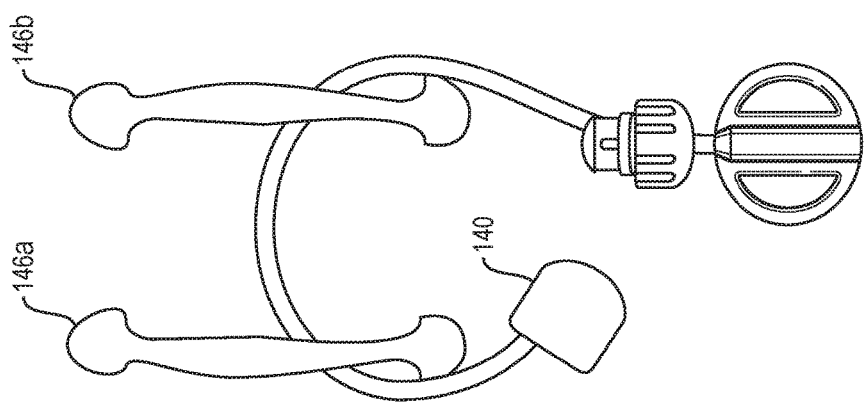
FIG. 8 is a perspective view of the cord locking device in accordance with the teachings of FIG. 7 passed through 2 door handles in preparation for securing the door handles in position.

In use, the cap 124 is loosened by turning at counterclockwise such that the cord 138 moves freely through the cord lock 106 such that the handle 128 can be placed proximate the 124, see FIG. 7. Next, the connector portion 140 is fed through the handles 146, FIG. 8.

Figure 10:
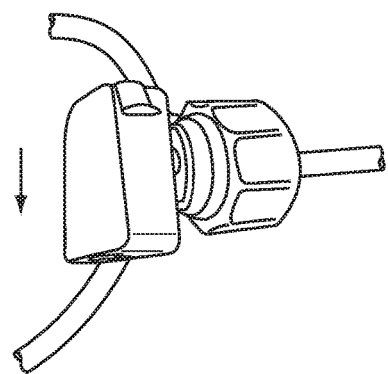
FIG. 10 is a perspective view of the cord locking device in accordance with the teachings of FIG. 7 illustrating the connector engaged with the lock mechanism.
Figure 9:
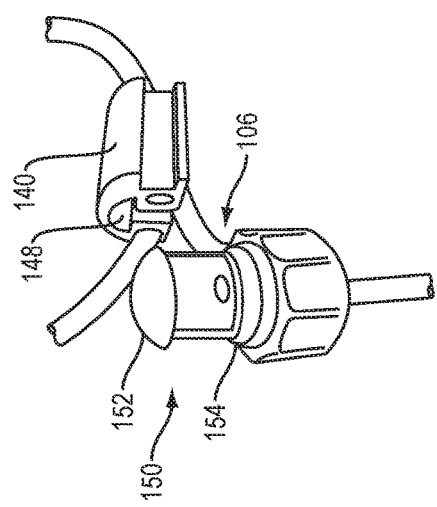
FIG. 9 is a perspective view of the cord locking device in accordance with the teachings of FIG. 7 showing the interconnection between the connector and the lock mechanisms.

As shown in FIG. 9, the connector portion 140 includes an interior channel 148 which has generally the same shape as the top portion 150 of the cord lock 106 including a domed portion 152 and a straight walled side portion 154. The connector to which is coupled a cord end 145 is then slid onto and engaged with the cord lock 106, FIG. 10. Next, the user pulls downward on the handle portion 128 as shown by arrow 154 while simultaneously pushing up on the cord lock 106 as shown by arrow 156, which causes the cord to be pulled through the cord lock 106 tightening the cord around the 2 handles 146, FIG. 11. Once the cord is tight, the 124 is tightened by turning at clockwise as shown by arrow 158, FIG. 12 thereby securing the cord locking device 100 around the 2 handles 146 thereby preventing the 2 cupboards or other similar devices to which the handles 146 are attached from being opened.

Figure 13:
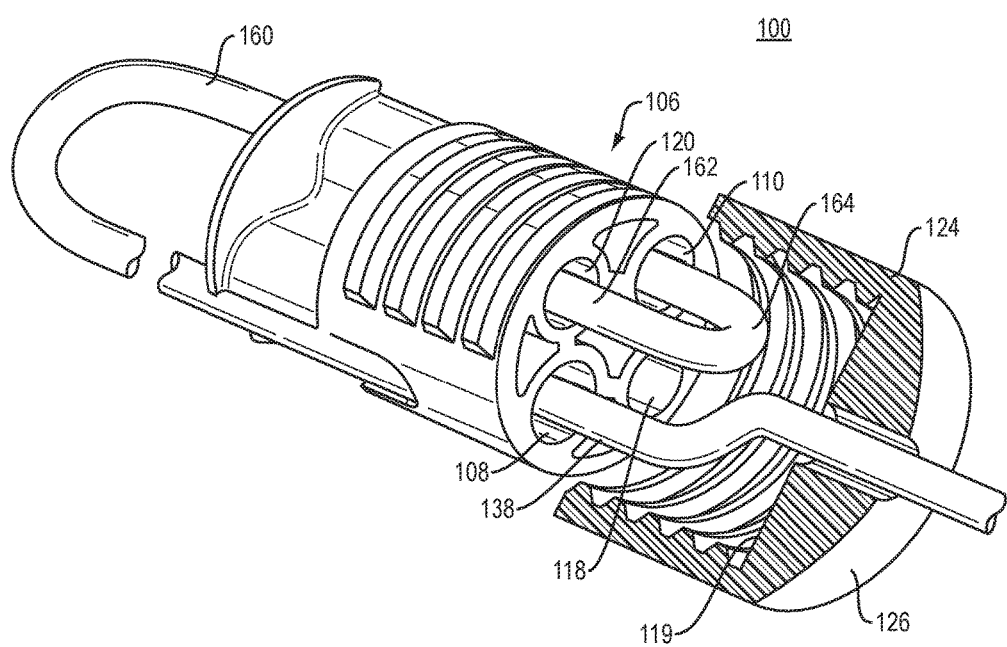
FIG. 13 is a perspective view of the cord locking device in accordance with the present invention ready to be utilized in accordance with a second embodiment of the use of the present invention.
Figure 15:
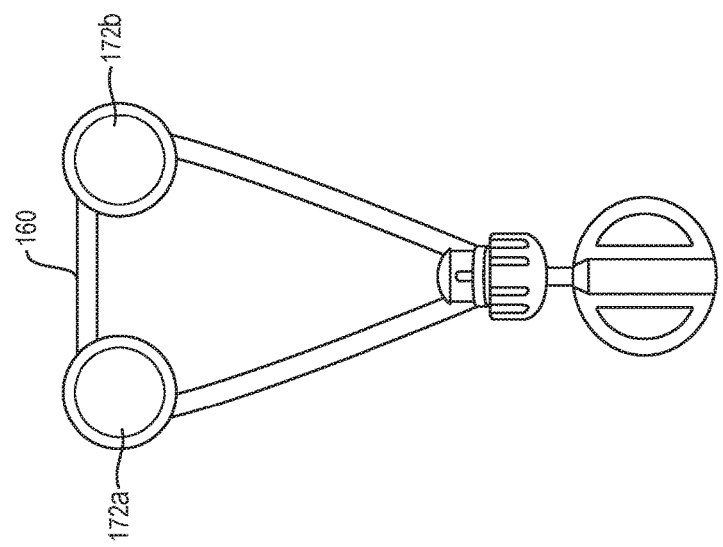
FIG. 15 is a perspective view of the cord locking device in accordance with the teachings of FIG. 13 passed around 2 door knobs in preparation for securing the door knobs in position.

In another embodiment, the cord locking device 100, FIG. 13, is utilized without a connector device as explained in connection with FIGS. 7 through 12. This embodiment is well-suited for securing a cord around 2 knobs over which the cord may be placed instead of having to slide a cord and through handles as explained in connection with the first embodiment.

Figure 6:
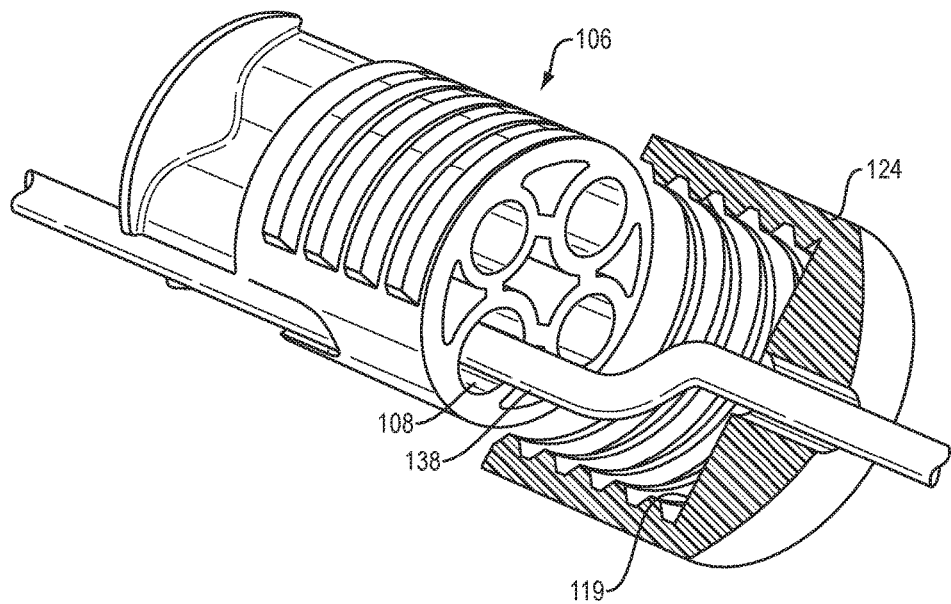
FIG. 6 is a perspective view of an unassembled cord locking device in accordance with the present invention illustrating a first cord portion passing through and secured by the cord locking device.

In this embodiment, the same components and methodology are utilized as was explained in connection with FIG. 6 above. As shown in FIG. 13, in addition to the first cord portion 138 which exits cord opening 108 and is then provided through opening 126 in cap 124, a second cord and 162 is fed or threaded down through the cord lock 106 exiting the second cord opening 110. The end of the cord is then fed upwardly into one or the other of the first or second cord end channels 118, 120 (shown as inserted into the second cord end channel 120 for illustrative purposes only) which forms a curvature or band 164 in the cord. When the cap 124 is tightened, the first cord region 138 as well as the second cord region bend 164 will be pushed up against the bottom region 116 of the Lock 106 by the Interior surface 119 of the cap 124, thus forming a cord loop 160 which is fixed in dimension. Loosening cap 124 allows the cord loop 160 to be made shorter or longer as needed, as will be explained in greater detail below in connection with FIGS. 14 through 17.

Figure 14:
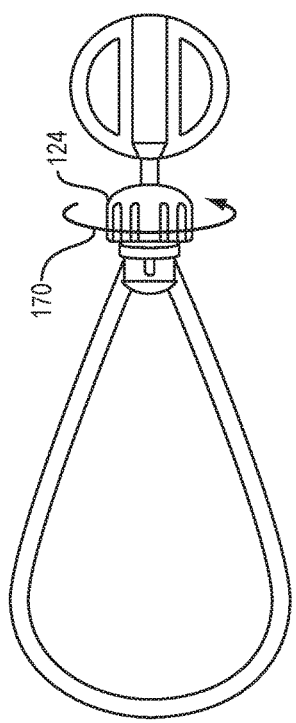
FIG. 14 is a perspective view of the cord locking device in accordance with the teachings of FIG. 13 in preparation to be utilized in accordance with the second embodiment of the use of the present invention.
Figure 17:
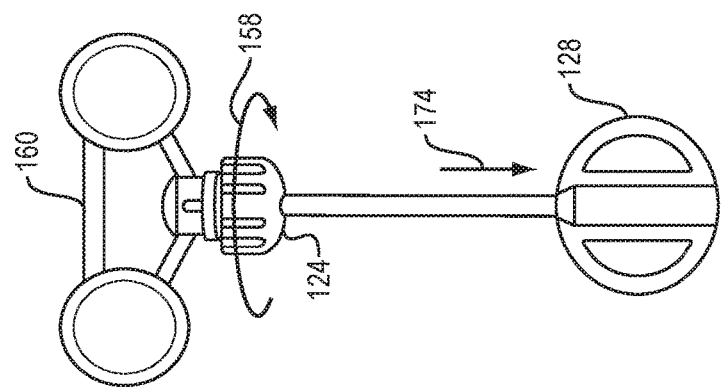
FIG. 17 is a perspective view of the cord locking device in accordance with the teachings of FIG. 13 illustrating the securing of the cap to the lock and thus securing the cord by the cord locking device in accordance with the present invention.
Figure 16:
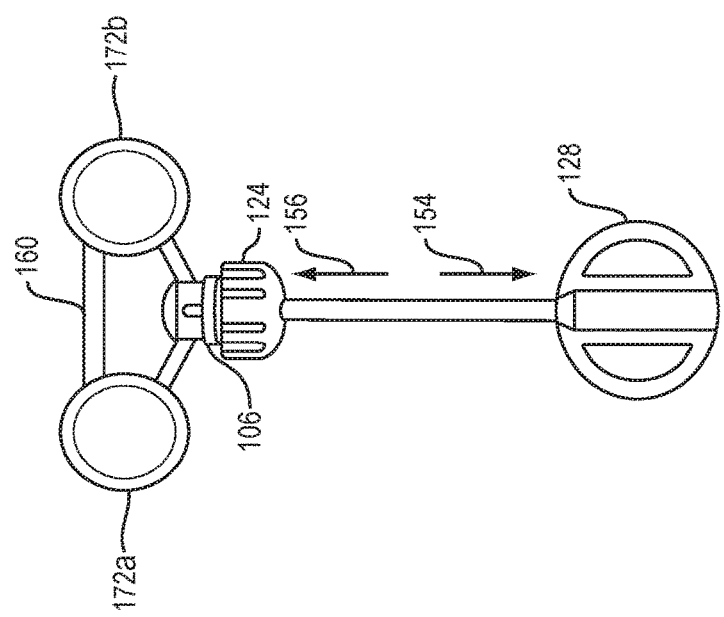
FIG. 16 is a perspective view of the cord locking device in accordance with the teachings of FIG. 13 illustrating the adjustment procedure to be performed when utilizing the cord locking device of the invention.

In order to utilize the cord locking device configured in accordance with the second embodiment of the present invention, the 124, FIG. 14, is turned counterclockwise as illustrated by arrow 170. Next, the cord loop 160 is placed around first and second knobs 172a, 172, FIG. 15. Next, the cord handle 128 is pulled downward as indicated by arrow 154, FIG. 16 while simultaneously the cord lock device 106 is pushed upwardly as indicated generally by arrow 156. Once the cord loop 160 is tight around the knobs 172, the cap 124 is tightened by turning it clockwise as indicated generally by arrow 158, FIG. 17 while maintaining a downward pull on the handle 128 as indicated generally by arrow 174. In this manner, the cord loop 160 is tight around the first and second knobs 172 thereby preventing the adjacent doors, cabinets, drawers or the like to which they knobs 172 are attached from being opened.

Accordingly, the present invention provides a novel cord locking device 100 that is easily adjustable to almost infinitely adjust the length of a cord 138 being locked by the device 100 around several objects such as handles or knobs attached to drawers, doors or the like and which are desired to be maintained closed or locked.

As stated above, the present invention is not intended to be limited to a device or method which must satisfy one or more of any stated or implied objects or features of the invention and should not be limited to the preferred, exemplary, or primary embodiments) described herein. Modifications and substitutions by one of ordinary skill in the art are considered to be within the scope of the present invention, which is not to be limited except by the allowed claims and their legal equivalents.

What is claimed is:

1. A cord locking device, for locking a cord around one or more objects by restricting longitudinal movement of a cord utilizing compressive forces and restrictive configurations, said cord locking device comprising:
   a cord having a length, a first end and a second end and an intermediate portion disposed between said first and second ends;
   a cord lock device comprising a top region and a bottom region and a body portion, said body portion including:
      a first cord channel extending from said top region to said bottom region through said body portion, said first cord channel configured for receiving a first cord portion from said top region of said cord lock device, said first cord channel disposed proximate a first side region of said body portion;
      a second cord channel extending from said top region to said bottom region through said body portion, said second cord channel separate from said first cord channel and configured for receiving a second cord end from said top region of said cord lock device, said second cord channel disposed proximate a second side region of said body portion;
      a first cord end channel extending from said bottom region at least partially through said body portion and disposed proximate a third side region of said body portion, said first cord end channel configured for receiving a first cord end from said bottom region; and
      a second cord end channel extending from said bottom region at least partially through said body portion and disposed proximate a fourth side region of said body portion, said second cord end channel separate from said first cord end channel and configured for receiving a second cord end from said bottom region; and
   a circular cap configured to adjustably engage and disengage with said bottom region of said body portion of said cord lock device, said circular cap including an aperture sized and configured to receive one of said first and second cord ends from one of said first and second cord channels, said cap configured to incrementally move towards and away from said bottom region of said body portion of said cord lock device, wherein said cap aperture is arranged generally in a central position in said circular cap, misaligned axially with said first and second cord channels, said cap aperture configured to enable passage of one of said first and second cord ends through said cap aperture, wherein said misalignment between an exit opening of one of said first and second cord channels and said cap aperture is configured to cause a portion of said cord disposed between said bottom region of said cord lock device and said cap aperture to follow a restrictive path between said exit opening of one of said first and second cord channels and said cap aperture, with a portion of said cord disposed against said bottom region of said cord lock device, wherein an interior surface of said cap is configured, when in an engaged position against said body portion of said cord lock device to generate a frictional force against said portion of said cord disposed between said inside surface of said cap and a generally flat planer area of said bottom portion of said body portion of said cord lock device, for restrictively compressing said cord portion between said generally flat planer area proximate said cord channel exit opening and said inside surface of said cap.

2. The cord locking device of claim 1, wherein said first cord channel is oriented in said body portion 180 degrees from said second cord channel.

3. The cord locking device of claim 1, wherein said first cord end channel is oriented in said body portion 180° from said second cord end channel.

4. The cord locking device of claim 3, wherein said first and second cord end channels are oriented in said body portion 90 degrees from said first and second cord channels.

5. The cord locking device of claim 1, wherein said first and second cord end channels have a diameter which is less than a diameter of said first and second cord channels.

6. The cord locking device of claim 1 further including a handle portion configured to receive one of said first and second cord ends after exiting from said cap aperture, said handle portion comprising a handle top end oriented towards said cord locking device, and a handle bottom end oriented away from said device.

7. The cord locking device of claim 6, wherein said handle portion includes a handle aperture configured to enable passage of one of said first and second cord ends through said handle portion in a first direction, said handle portion further including a shoulder region proximate an exit region of said handle aperture, said shoulder region configured to restrict passage of said one of said first and second cord ends in a second direction opposite said first direction after passage through said handle aperture.

8. The cord locking device of claim 1, further including a cord connector, fixedly coupled to one of said first and second cord ends, and configured to interconnect with a top region of the cord lock device.

9. A cord locking device, for locking a cord around one or more objects by restricting longitudinal movement of a cord utilizing compressive forces and restrictive configurations, said cord locking device comprising:
   a cord having a length, a first end and a second end and an intermediate portion disposed between said first and second ends;
   a cord lock device comprising a top region and a bottom region and a body portion, said body portion including:
      a first cord channel extending from said top region to said bottom region through said body portion, said first cord channel configured for receiving a first cord portion from said top region of said cord lock device, said first cord channel disposed proximate a first side region of said body portion;
      a second cord channel extending from said top region to said bottom region through said body portion, said second cord channel separate from said first cord channel and configured for receiving a second cord end from said top region of said cord lock device, said second cord channel disposed proximate a second side region of said body portion;
wherein said first cord channel is oriented in said body portion 180° from said second cord channel;
a first cord end channel extending from said bottom region at least partially through said body portion and disposed proximate a third side region of said body portion, said first cord end channel configured for receiving a first cord end from said bottom region; and
a second cord end channel extending from said bottom region at least partially through said body portion and disposed proximate a fourth side region of said body portion, said second cord end channel separate from said first cord end channel and configured for receiving a second cord end from said bottom region;
wherein said first cord end channel is oriented in said body portion 180 degrees from said second cord end channel, and wherein said first and second cord end channels are oriented in said body portion 90 degrees from said first and second cord channels respectively, and wherein said first and second cord end channels have a diameter which is less than a diameter of said first and second cord channels;
a circular cap configured to adjustably engage and disengage with said bottom region of said body portion of said cord lock device, said circular cap including an aperture sized and configured to receive one of said first and second cord ends from one of said first and second cord channels, said cap configured to incrementally move towards and away from said bottom region of said body portion of said cord lock device, wherein said cap aperture is arranged generally in a central position in said circular cap, misaligned axially with said first and second cord channels, said cap aperture configured to enable passage of one of said first and second cord ends through said cap aperture, wherein said misalignment between an exit opening of one of said first and second cord channels and said cap aperture is configured to cause a portion of said cord disposed between said bottom region of said cord lock device and said cap aperture to follow a restrictive path between said exit opening of one of said first and second cord channels and said cap aperture, with a portion of said cord disposed against said bottom region of said cord lock device, wherein an interior surface of said cap is configured, when in an engaged position against said body portion of said cord lock device to generate a frictional force against said portion of said cord disposed between said inside surface of said cap and a generally flat planer area of said bottom portion of said body portion of said cord lock device, for restrictively compressing said cord portion between said generally flat planer area proximate said cord channel exit opening and said inside surface of said cap; and
a handle portion, configured to receive one of said first and second cord ends after exiting from said cap aperture, said handle portion comprising a handle top end oriented towards said cord locking device, and a handle bottom end oriented away from said device.

* * * * *